United States Patent
Srivastava et al.

(10) Patent No.: US 11,885,269 B1
(45) Date of Patent: Jan. 30, 2024

(54) FUEL SYSTEM FOR PRIME MOVER

(71) Applicant: Caterpillar Inc., Peoria, IL (US)

(72) Inventors: Sagar Srivastava, Gorakhpur (IN); Venkat Vijay Kishore Turlapati, Hyderabad (IN); Venkatachalam Swaminathan, Bengaluru (IN); Avinash Krishna Bhat, Bengaluru (IN); Prakash Sadhasivam, Coimbatore (IN); Manas Koallay, Bangalore (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/331,200

(22) Filed: Jun. 8, 2023

(51) Int. Cl.
F02D 19/06 (2006.01)

(52) U.S. Cl.
CPC ..... F02D 19/0605 (2013.01); F02D 19/0615 (2013.01); F02D 19/0628 (2013.01); F02D 19/0647 (2013.01); F02D 19/0681 (2013.01)

(58) Field of Classification Search
CPC ............ F02D 19/0605; F02D 19/0615; F02D 19/0628; F02D 19/0647; F02D 19/0681
See application file for complete search history.

(56) References Cited

U.S. PATENT DOCUMENTS

| | | | |
|---|---|---|---|
| 5,868,162 A * | 2/1999 | Dickerson, Jr. ........ | F17C 13/025 137/557 |
| 7,228,841 B2 * | 6/2007 | Takemoto ........... | F02D 19/0615 123/304 |
| 8,342,274 B2 * | 1/2013 | Imamura ............... | B60W 10/02 180/65.285 |
| 9,046,049 B2 * | 6/2015 | Jeon ................... | F02M 21/0287 |
| 10,619,599 B1 | 4/2020 | Walser et al. | |
| 11,041,434 B2 | 6/2021 | Harknett et al. | |
| 11,215,126 B2 | 1/2022 | Chiu et al. | |
| 11,519,345 B2 | 12/2022 | Gysi et al. | |
| 2004/0139943 A1 * | 7/2004 | Kern ....................... | F02B 43/00 123/198 D |
| 2012/0210988 A1 | 8/2012 | Willi | |

* cited by examiner

*Primary Examiner* — Grant Moubry

(57) ABSTRACT

A fuel system for a prime mover includes a controller including at least one processor to determine a primary pressure value for a primary fuel, determine a secondary pressure value for a secondary fuel, and perform a first switch from the primary fuel to the secondary fuel if the primary pressure value is lesser than a first lower pressure threshold value, the secondary pressure value is greater than a second upper pressure threshold value, an operating speed value of the prime mover is greater than a fuel type initialization speed threshold value for the prime mover, an absolute speed error value is lesser than a steady-state absolute speed error threshold value for the prime mover, an operating load to be applied on the prime mover is greater than a rated load of the secondary fuel, and a fuel switchover timer threshold duration from a previous fuel switching event has elapsed.

20 Claims, 3 Drawing Sheets

FUEL SYSTEM FOR PRIME MOVER

TECHNICAL FIELD

The present disclosure relates to a fuel system associated with a prime mover, and a system including the prime mover and the fuel system.

BACKGROUND

A system, such as a power generation system commonly referred to as a generator set or a genset, includes a prime mover and a generator operably coupled to the prime mover. The prime mover drives the generator, and the generator produces electric power that may be used for a variety of operations at a worksite. The prime mover may include, for example, an engine that may operate on dual fuels, such as natural gas, liquid propane, or other types of fuel. Typically, the prime mover operates on one fuel at a time depending on factors, such as, fuel line pressures, fuel availability, or quality.

However, in some cases the availability of fuels in certain areas may not be consistent due to seismic movements, line interruptions, and the like. For example, there may be a sudden pressure drop in a fuel line of a primary fuel being supplied to the prime mover. In such conditions, it may be required to switch from the primary fuel to a secondary fuel.

Conventional techniques of changing from one fuel to another may be time consuming and may lead to unexpected downtime. Further, conventional techniques of changeover from one fuel to another may require manual intervention to restart the system. Furthermore, conventional techniques do not teach automatic switching between the primary and secondary fuels, without shutting the prime mover down or impacting a performance of the system.

U.S. Pat. No. 11,215,126 describes a control circuit for a dual fuel generator includes a primary fuel valve to control the supply of a primary fuel, a secondary fuel valve to control the supply of a secondary fuel, a primary fuel pressure switch to detect the primary fuel, a secondary fuel pressure switch to detect the secondary fuel, and a controller. The controller is configured to receive a primary signal for availability of the primary fuel from the primary fuel pressure switch and a secondary signal for availability of the secondary fuel from the secondary and operate the primary fuel valve and the secondary fuel valve in response to the primary signal and the secondary signal. When the secondary fuel valve is open so that the secondary fuel is provided to the dual fuel generator, the control circuit is configured to ground the primary signal by connecting the primary fuel pressure switch to ground.

SUMMARY OF THE DISCLOSURE

In an aspect of the present disclosure, a fuel system associated with a prime mover is provided. The fuel system includes a primary fuel assembly to selectively supply a primary fuel to the prime mover. The fuel system also includes a secondary fuel assembly to selectively supply a secondary fuel to the prime mover. The primary fuel is different from the secondary fuel. The fuel system further includes a controller. The controller controls a supply of at least one of the primary fuel and the secondary fuel to the prime mover. The controller includes at least one memory. The at least one memory stores a fuel type initialization speed threshold value for the prime mover, a steady-state absolute speed error threshold value for the prime mover, and a fuel switchover timer threshold duration from a previous fuel switching event. The at least one memory further stores a first upper pressure threshold value and a first lower pressure threshold value for the primary fuel. The at least one memory further stores a second upper pressure threshold value and a second lower pressure threshold value for the secondary fuel. The controller also includes at least one processor communicably coupled with the at least one memory. The at least one processor determines an operating speed value of the prime mover, an operating load to be applied on the prime mover, and an absolute speed error value. The at least one processor also determines if the primary fuel is being supplied to the prime mover. The at least one processor further determines a primary pressure value corresponding to the primary fuel. The at least one processor determines a secondary pressure value corresponding to the secondary fuel. The at least one processor also compares the primary pressure value with each of the first upper pressure threshold value and the first lower pressure threshold value, and the secondary pressure value with each of the second upper pressure threshold value and the second lower pressure threshold value. The at least one processor further compares the operating speed value of the prime mover with the fuel type initialization speed threshold value for the prime mover and the absolute speed error value with the steady-state absolute speed error threshold value for the prime mover. The at least one processor compares the operating load to be applied on the prime mover with a rated load of the secondary fuel. The at least one processor also determines if the fuel switchover timer threshold duration from the previous fuel switching event has elapsed. The at least one processor further performs a first switch from the primary fuel to the secondary fuel if the primary pressure value is lesser than the first lower pressure threshold value, the secondary pressure value is greater than the second upper pressure threshold value, the operating speed value of the prime mover is greater than the fuel type initialization speed threshold value for the prime mover, the absolute speed error value is lesser than the steady-state absolute speed error threshold value for the prime mover, the operating load to be applied on the prime mover is greater than the rated load of the secondary fuel, and the fuel switchover timer threshold duration from the previous fuel switching event has elapsed.

In another aspect of the present disclosure, a system is provided. The system includes a prime mover. The system also includes a fuel system adapted to supply fuel to the prime mover. The fuel system includes a primary fuel assembly to selectively supply a primary fuel to the prime mover. The fuel system also includes a secondary fuel assembly to selectively supply a secondary fuel to the prime mover. The primary fuel is different from the secondary fuel. The fuel system further includes a controller. The controller controls a supply of at least one of the primary fuel and the secondary fuel to the prime mover. The controller includes at least one memory. The at least one memory stores a fuel type initialization speed threshold value for the prime mover, a steady-state absolute speed error threshold value for the prime mover, and a fuel switchover timer threshold duration from a previous fuel switching event. The at least one memory further stores a first upper pressure threshold value and a first lower pressure threshold value for the primary fuel. The at least one memory further stores a second upper pressure threshold value and a second lower pressure threshold value for the secondary fuel. The controller also includes at least one processor communicably coupled with the at least one memory. The at least one processor determines an operating speed value of the prime mover, an operating load to be applied on the prime mover, and an absolute speed error value. The at least one processor also determines if the primary fuel is being supplied to the prime mover. The at least one processor further determines a primary pressure value corresponding to the primary fuel. The at least one processor determines a secondary pressure value corresponding to the secondary fuel. The at least one processor also compares the primary pressure value with each of the first upper pressure threshold value and the first lower pressure threshold value, and the secondary pressure value with each of the second upper pressure threshold value and the second lower pressure threshold value. The at least one processor further compares the operating speed value of the prime mover with the fuel type initialization speed threshold value for the prime mover and the absolute speed error value with the steady-state absolute speed error threshold value for the prime mover. The at least one processor compares the operating load to be applied on the prime mover with a rated load of the secondary fuel. The at least one processor also determines if the fuel switchover timer threshold duration from the previous fuel switching event has elapsed. The at least one processor further performs a first switch from the primary fuel to the secondary fuel if the primary pressure value is lesser than the first lower pressure threshold value, the secondary pressure value is greater than the second upper pressure threshold value, the operating speed value of the prime mover is greater than the fuel type initialization speed threshold value for the prime mover, the absolute speed error value is lesser than the steady-state absolute speed error threshold value for the prime mover, the operating load to be applied on the prime mover is greater than the rated load of the secondary fuel, and the fuel switchover timer threshold duration from the previous fuel switching event has elapsed.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
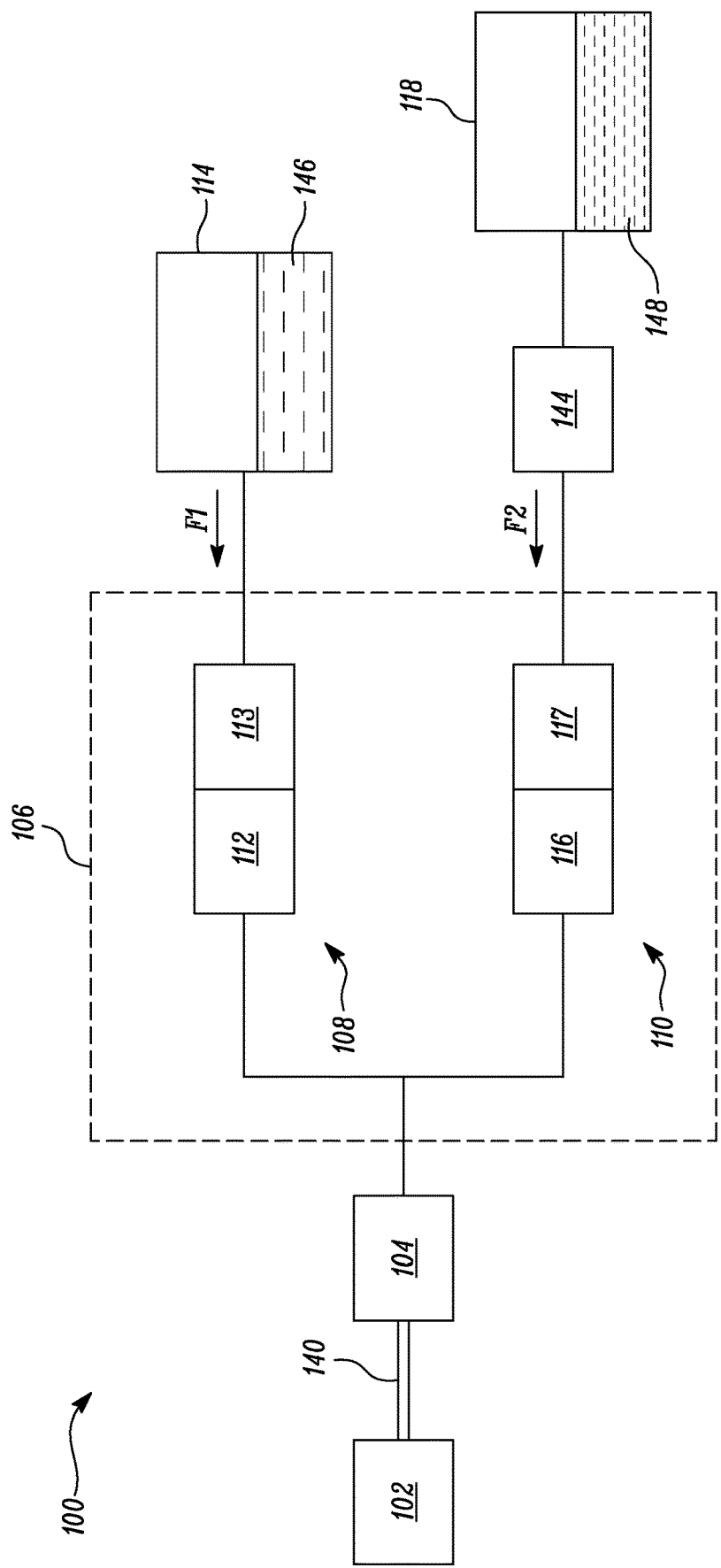
FIG. 1 is a schematic block diagram of a system used for generating power, according to an example of the present disclosure.

Referring to FIG. 1, a schematic block diagram of a system 100 is illustrated. The system 100 is embodied as a power generation system herein. Alternatively, the system 100 may be utilized for gas compression, drilling, and other applications. The system 100 may be commonly referred to as a generator set or a genset. The system 100 may be used to produce and supply electric power at a worksite. The system 100 includes a generator 102 operable to produce a supply of electric power. The electric power may be a single phase or three phase alternating current (AC) power at a desired voltage and frequency. The generator 102 may also include one or more transformers (not shown) to facilitate an output of current at desired voltages. In another example, the generator 102 may provide electric power as a direct current (DC) power at a desired voltage.

The system 100 also includes a prime mover 104. The prime mover 104 includes an engine herein. The engine may include, for example, an internal combustion spark-ignition engine, or a compression-ignition engine. In the illustrated example, the prime mover 104 is operable to drive the generator 102. A drive shaft 140 of the system 100 may operably couple the generator 102 with the prime mover 104. A rotation of the drive shaft 140 drives the generator 102 to produce the electric power.

The present disclosure relates to a fuel system 106 associated with the prime mover 104. Specifically, the system 100 includes the fuel system 106 to supply fuel to the prime mover 104. It should be noted that the fuel system 106 is not limited to use with the system 100. Accordingly, the fuel system 106 can be associated with any other stationary application or mobile application, without any limitations. The fuel system 106 includes a primary fuel assembly 108. The primary fuel assembly 108 selectively supplies a primary fuel 146 to the prime mover 104. It should be noted that the primary fuel 146 is a default or a preferred fuel for powering the prime mover 104 of the system 100. In the illustrated example, the primary fuel 146 includes natural gas. However, the primary fuel 146 may include any other type of fuel.

The primary fuel assembly 108 includes one or more primary valves 112, 113. The one or more primary valves 112, 113 receive the primary fuel 146 from a primary fuel source 114 associated with the primary fuel assembly 108. In an example, the primary fuel source 114 may include a fuel tank that stores the primary fuel 146 at a high pressure therein. Alternatively, the primary fuel source 114 may simply include a high pressure fuel line, such as, a natural gas pipeline. In some examples, the primary fuel source 114 may be coupled to the system 100 by a tube (not shown). Further, components, such as shut-off valves, pressure regulators, pressure test ports, and the like may be disposed between the primary fuel source 114 and the primary valves 112, 113.

The primary fuel assembly 108 includes two primary valves 112, 113 herein. Specifically, the primary fuel assembly 108 includes a first primary valve 112 and a second primary valve 113. The primary valve 112 is disposed downstream of the primary valve 113 relative to a primary fuel flow direction F1 from the primary fuel source 114 towards the prime mover 104. An opening of each primary valve 112, 113 supplies the primary fuel 146 to the prime mover 104 and a closing of each primary valve 112, 113 prevents the supply of the primary fuel 146 to the prime mover 104. Thus, the primary valves 112, 113 may shut-off or allow the supply of the primary fuel 146 to the prime mover 104. In some examples, each primary valve 112, 113 may include a solenoid operated shut-off valve.

The fuel system 106 also includes a secondary fuel assembly 110. The secondary fuel assembly 110 selectively supplies a secondary fuel 148 to the prime mover 104. The primary fuel 146 is different from the secondary fuel 148. In the illustrated example, the secondary fuel 148 includes liquid propane. However, the secondary fuel 148 may include any other type of fuel. The primary fuel 146 and/or the secondary fuel 148 may include biogas, diesel, heavy fuel oil, or any other suitable fuel.

The secondary fuel assembly 110 includes one or more secondary valves 116, 117. The one or more secondary valves 116, 117 receive the secondary fuel 148 from a secondary fuel source 118 associated with the secondary fuel assembly 110. In an example, the secondary fuel source 118 may include a fuel tank that stores the secondary fuel 148 at a high pressure therein. Alternatively, the secondary fuel source 118 may simply include a high pressure fuel line, such as, a pipeline supplying liquid propane. In some examples, the secondary fuel source 118 may be coupled to the system 100 by a tube (not shown). Further, components, such as shut-off valves, pressure test ports, and the like may be disposed between the secondary fuel source 118 and the prime mover 104. Furthermore, a vaporizer 144 may be disposed upstream of the secondary valves 116, 117 along a secondary fuel flow direction F2 from the secondary fuel source 118 towards the prime mover 104. The vaporizer 144 may convert the secondary fuel 148 (for example, liquid propane) into a vaporized fuel (for example, vapor propane).

Further, the secondary fuel assembly 110 includes two secondary valves 116, 117. Specifically, the secondary fuel assembly 110 includes a first secondary valve 116 and a second secondary valve 117. The secondary valve 116 is disposed downstream of the secondary valve 117 relative to the secondary fuel flow direction F2. An opening of each secondary valve 116, 117 supplies the secondary fuel 148 to the prime mover 104 and a closing of each secondary valve 116, 117 prevents the supply of the secondary fuel 148 to the prime mover 104. Thus, the secondary valves 116, 117 may shut-off or allow the supply of the secondary fuel 148 to the prime mover 104. In some examples, each secondary valve 116, 117 may include a solenoid operated shut-off valve.

Figure 2:
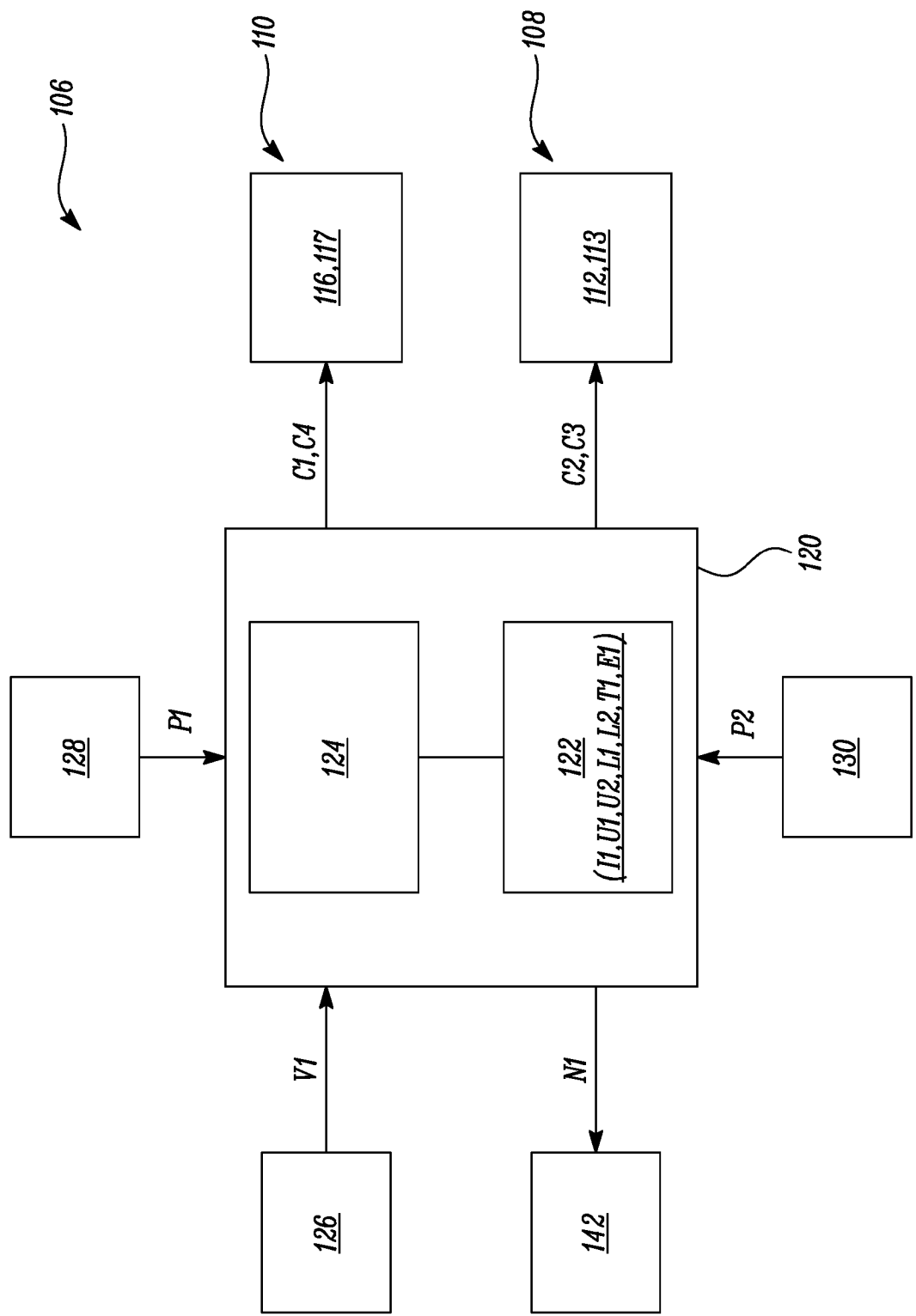
FIG. 2 is a schematic block diagram of a fuel system associated with the system of FIG. 1, according to an example of the present disclosure.

Referring to FIG. 2, a schematic block diagram of the fuel system 106 associated with the system 100 of FIG. 1 is illustrated. The fuel system 106 includes a controller 120. The controller 120 controls a supply of the primary fuel 146 (see FIG. 1) and/or the secondary fuel 148 (see FIG. 1) to the prime mover 104 (see FIG. 1). The controller 120 is communicably coupled with the primary valves 112, 113 and the secondary valves 116, 117.

The controller 120 includes one or more memories 122. The memories 122 may include any means of storing information, including a hard disk, an optical disk, a floppy disk, ROM (read only memory), RAM (random access memory), PROM (programmable ROM), EEPROM (electrically erasable PROM), and/or other computer-readable memory media. The memories 122 may store data, such as, algorithms, instructions, arithmetic operations, and the like.

The one or more memories 122 store a fuel type initialization speed threshold value I1 for the prime mover 104. The term "fuel type initialization speed threshold value" as used herein may refer to a speed of the prime mover 104 below which the fuel type initialization happens during a start-up of the prime mover 104. It should be noted that, an operating speed value V1 of the prime mover 104 being lesser than the fuel type initialization speed threshold value I1 may indicate that the prime mover 104 is undergoing a start-up based on a run command from an operator. The term "start-up condition" as used herein refers to transition in which the prime mover 104 goes from zero to its rated speed. Further, the one or more memories 122 also store a steady-state absolute speed error threshold value E1 for the prime mover 104. The term "steady-state absolute speed error threshold value" as used herein may be defined as an acceptable difference between the operating speed value V1 of the prime mover 104 and a desired operating speed value of the prime mover 104 in a steady-state condition. The term "steady-state condition" as used herein may refer to the prime mover 104 operating at speeds close to the desired operating speed value within a tolerance band of steady-state absolute speed error threshold value E1.

Further, the one or more memories 122 store a fuel switchover timer threshold duration T1 from a previous fuel switching event. The term "fuel switchover timer threshold duration" as used herein may be indicative of a time duration from a previous fuel switching event within which any switching between the primary fuel 146 and the secondary fuel 148 is restricted. Further, the term "fuel switching event" as used in this disclosure may be indicative of an event wherein the fuel type is changed from the primary fuel 146 to the secondary fuel 148, or vice versa.

The one or more memories 122 also store a first upper pressure threshold value U1 and a first lower pressure threshold value L1 for the primary fuel 146. The first upper pressure threshold value U1 and the first lower pressure threshold value L1 create hysteresis to prevent switching from or to the primary fuel 146 inadvertently, as well to prevent switching of the primary fuel assembly 108 between an on state and an off state. The one or more memories 122 further store a second upper pressure threshold value U2 and a second lower pressure threshold value L2 for the secondary fuel 148. The second upper pressure threshold value U2 and the second lower pressure threshold value L2 create hysteresis to prevent switching from or to the secondary fuel 148 inadvertently, as well to prevent switching of the secondary fuel assembly 110 between an on state and an off state.

The controller 120 also includes one or more processors 124 communicably coupled with the one or more memories 122. It should be noted that the one or more processors 124 may embody a single microprocessor or multiple microprocessors for receiving various input signals and generating output signals. Numerous commercially available microprocessors may perform the functions of the one or more processors 124. Each processor 124 may further include a general processor, a central processing unit, an application specific integrated circuit (ASIC), a digital signal processor, a field programmable gate array (FPGA), a digital circuit, an analog circuit, a microcontroller, any other type of processor, or any combination thereof. Each processor 124 may include one or more components that may be operable to execute computer executable instructions or computer code that may be stored and retrieved from the one or more memories 122. The processors 124 may execute several types of digitally stored instructions, such as, a software program or an algorithm, retrieved from the memories 122, or a firmware program which may enable the processors 124 to perform a wide variety of operations.

Further, the one or more processors 124 determine the operating speed value V1 of the prime mover 104, an operating load to be applied on the prime mover 104, and an absolute speed error value V2. A speed sensor 126 may be associated with the prime mover 104. The speed sensor 126 may be communicably coupled with the processors 124. The processors 124 may receive the operating speed value V1 of the prime mover 104 from the speed sensor 126. Further, the term "absolute speed error value" as used herein may be defined as a modulus of a real-time difference between the actual operating speed value V1 of the prime mover 104 and the desired operating speed value of the prime mover 104. The desired operating speed value of the prime mover 104 may be stored in the memories 122.

The one or more processors 124 also determine if the primary fuel 146 is being supplied to the prime mover 104. Specifically, the one or more processors 124 generate a first indication to indicate that the primary fuel 146 is being supplied to the prime mover 104. For example, during the start-up condition of the prime mover 104, the processors 124 may determine if the primary fuel 146 is to be supplied to the prime mover 104. If the processors 124 determine that the primary fuel 146 is to be supplied to the prime mover 104, the processors 124 generate the first indication to indicate that the primary fuel 146 is being supplied to the prime mover 104. Further, after a fuel switch is performed from the secondary fuel 148 to the primary fuel 146, the processors 124 again generate the first indication to indicate that the primary fuel 146 is being supplied to the prime mover 104. Similarly, the one or more processors 124 may also determine if the secondary fuel 148 is being supplied to the prime mover 104. Specifically, the one or more processors 124 generate a second indication to indicate that the secondary fuel 148 is being supplied to the prime mover 104. For example, during the start-up condition of the prime mover 104, the processors 124 may determine if the secondary fuel 148 is to be supplied to the prime mover 104. If the processors 124 determine that the secondary fuel 148 is to be supplied to the prime mover 104, the processors 124 generate the second indication to indicate that the secondary fuel 148 is being supplied to the prime mover 104. Further, after a furl switch is performed from the primary fuel 146 to the secondary fuel 148, the processors 124 again generate the second indication to indicate that the secondary fuel 148 is being supplied to the prime mover 104. Thus, the first and second indications provide information regarding a type of fuel that is currently being supplied to the prime mover 104. The one or more processors 124 further determine a primary pressure value P1 corresponding to the primary fuel 146. In some examples, the processors 124 may be in communication with a primary fuel pressure sensor/switch 128 to determine the primary pressure value P1. In some examples, the primary fuel pressure sensor/switch 128 may be disposed upstream of the primary valves 112, 113 relative to the primary fuel flow direction F1 (see FIG. 1) to measure the primary pressure value P1. In an example, the primary fuel pressure sensor/switch 128 may be disposed in the tube that supplies the primary fuel 146 to the prime mover 104 or within the primary fuel source 114 (see FIG. 1).

The one or more processors 124 determine a secondary pressure value P2 corresponding to the secondary fuel 148. In some examples, the processors 124 may be in communication with a secondary fuel pressure sensor/switch 130 to determine the secondary pressure value P2. In some examples, the secondary fuel pressure sensor/switch 130 may be disposed upstream of the secondary valves 116, 117 relative to the secondary fuel flow direction F2 (see FIG. 1) to measure the secondary pressure value P2. In an example, the secondary fuel pressure sensor/switch 130 may be disposed in the tube that supplies the secondary fuel 148 to the prime mover 104 or within the secondary fuel source 118 (see FIG. 1).

Further, the one or more processors 124 also compare the primary pressure value P1 with each of the first upper pressure threshold value U1 and the first lower pressure threshold value L1, and the secondary pressure value P2 with each of the second upper pressure threshold value U2 and the second lower pressure threshold value L2. The one or more processors 124 also compare the operating speed value V1 of the prime mover 104 with the fuel type initialization speed threshold value I1 for the prime mover 104 and the absolute speed error value V2 with the steady-state absolute speed error threshold value E1 for the prime mover 104. Further, the one or more processors 124 compare the operating load to be applied on the prime mover 104 with a rated load of the secondary fuel 148. Furthermore, the one or more processors 124 determine if the fuel switchover timer threshold duration T1 from the previous fuel switching event has elapsed.

Moreover, the one or more processors 124 perform a first switch from the primary fuel 146 to the secondary fuel 148 if the primary pressure value P1 is lesser than the first lower pressure threshold value L1, the secondary pressure value P2 is greater than the second upper pressure threshold value U2, the operating speed value V1 of the prime mover 104 is greater than the fuel type initialization speed threshold value I1 for the prime mover 104, the absolute speed error value V2 is lesser than the steady-state absolute speed error threshold value E1 for the prime mover 104, the operating load to be applied on the prime mover 104 is greater than the rated load of the secondary fuel 148, and the fuel switchover timer threshold duration T1 from the previous fuel switching event has elapsed. It should be noted that the operating speed value V1 of the prime mover 104 being lesser than the fuel type initialization speed threshold value I1 for the prime mover 104 may indicate that the prime mover 104 is undergoing a start-up based on a run command from the operator. It should be further noted that the absolute speed error value V2 being greater than the steady-state absolute speed error threshold value E1 for the prime mover 104 may indicate that the prime mover 104 is operating in a transient condition. The term "transient condition" as used herein may refer to the prime mover 104 operating at speeds outside of a tolerance band of the steady-state absolute speed error threshold value E1 around the desired operating speed value.

The first switch causes the secondary fuel 148 to be supplied to the prime mover 104 instead of the primary fuel 146. Further, in order to perform the first switch, the one or more processors 124 transmit a first control signal C1 to open the one or more secondary valves 116, 117, and a second control signal C2 to close the one or more primary valves 112, 113. Accordingly, each secondary valve 116, 117 is opened to allow the supply of the secondary fuel 148 to the prime mover 104 and each primary valve 112, 113 is closed to prevent the supply of the primary fuel 146 to the prime mover 104.

Further, the one or more processors 124 may keep receiving the primary and secondary pressure values P1, P2 from the primary and secondary fuel pressure sensors/switches 128, 130. Accordingly, the one or more processors 124 may determine if the primary pressure value P1 is greater than the first upper pressure threshold value U1 after the first switch from the primary fuel 146 to the secondary fuel 148. Furthermore, the one or more processors 124 may perform a second switch from the secondary fuel 148 to the primary fuel 146 if the primary pressure value P1 is greater than the first upper pressure threshold value U1, the operating speed value V1 of the prime mover 104 is greater than the fuel type initialization speed threshold value I1 for the prime mover 104, the absolute speed error value V2 is lesser than the steady-state absolute speed error threshold value E1 for the prime mover 104, and the fuel switchover timer threshold duration T1 from the previous fuel switching event has elapsed. To perform the second switch, the one or more processors 124 transmit a third control signal C3 to open the one or more primary valves 112, 113, and a fourth control signal C4 to close the one or more secondary valves 116, 117. Accordingly, each primary valve 112, 113 is opened to allow the supply of the primary fuel 146 to the prime mover 104 and each secondary valve 116, 117 is closed to prevent the supply of the secondary fuel 148 to the prime mover 104.

It should be noted that the one or more processors 124 may restrict any switching between the primary fuel 146 and the secondary fuel 148 until an elapse of the fuel switchover timer threshold duration T1. In other words, the processors 124 may determine if a time duration since the previous fuel switching event (for example, the first switch or the second switch) is greater than the fuel switchover timer threshold duration T1 to perform a subsequent first or second switch. Thus, the processors 124 may perform the first switch only after the elapse of the fuel switchover timer threshold duration T1 from a previous second switch. Similarly, the processors 124 may perform the second switch only after the elapse of the fuel switchover timer threshold duration T1 from a previous first switch.

Further, the one or more processors 124 may continue the supply of the primary fuel 146 to the prime mover 104 if the primary pressure value P1 is lesser than the first lower pressure threshold value L1 and the secondary pressure value P2 is lesser than the second lower pressure threshold value L2. In other words, when each of the primary pressure value P1 and the secondary pressure value P2 is lesser than the corresponding first lower pressure threshold value L1 and the second lower pressure threshold value L2, the processors 124 may keep the primary valves 112, 113 open to continue the supply of the primary fuel 146 and prevent the supply of the secondary fuel 148.

Additionally, the one or more processors 124 may transmit a notification N1 to indicate that the primary pressure value P1 is lesser than the first lower pressure threshold value L1 and the secondary pressure value P2 is lesser than the second lower pressure threshold value L2. In some examples, the one or more processors 124 may transmit the notification N1 to an output module 142 associated with the system 100. The output module 142 may include a user interface that may display the notification N1 to the operator of the system 100 to indicate that the primary pressure value P1 is lesser than the first lower pressure threshold value L1 and the secondary pressure value P2 is lesser than the second lower pressure threshold value L2, so that the operator may take appropriate corrective actions. In some cases, the notification N1 may include a text alert, an icon, an audio alert, a flashing light, or a combination thereof.

It should be noted that, during the start-up condition of the prime mover 104, the processors 124 may determine whether the primary fuel 146 or the secondary fuel 148 should be supplied to the prime mover 104 based on the primary and secondary pressure values P1, P2. For example, if the primary pressure value P1 is greater than the first upper pressure threshold value U1, the processors 124 generate control signals to supply the primary fuel 146 to the prime mover 104. However, if the primary pressure value P1 is lesser than the first lower pressure threshold value L1 and the secondary pressure value P2 is greater than the second upper pressure threshold value U2, the processors 124 generate control signals to supply the secondary fuel 148 to the prime mover 104.

Figure 3:
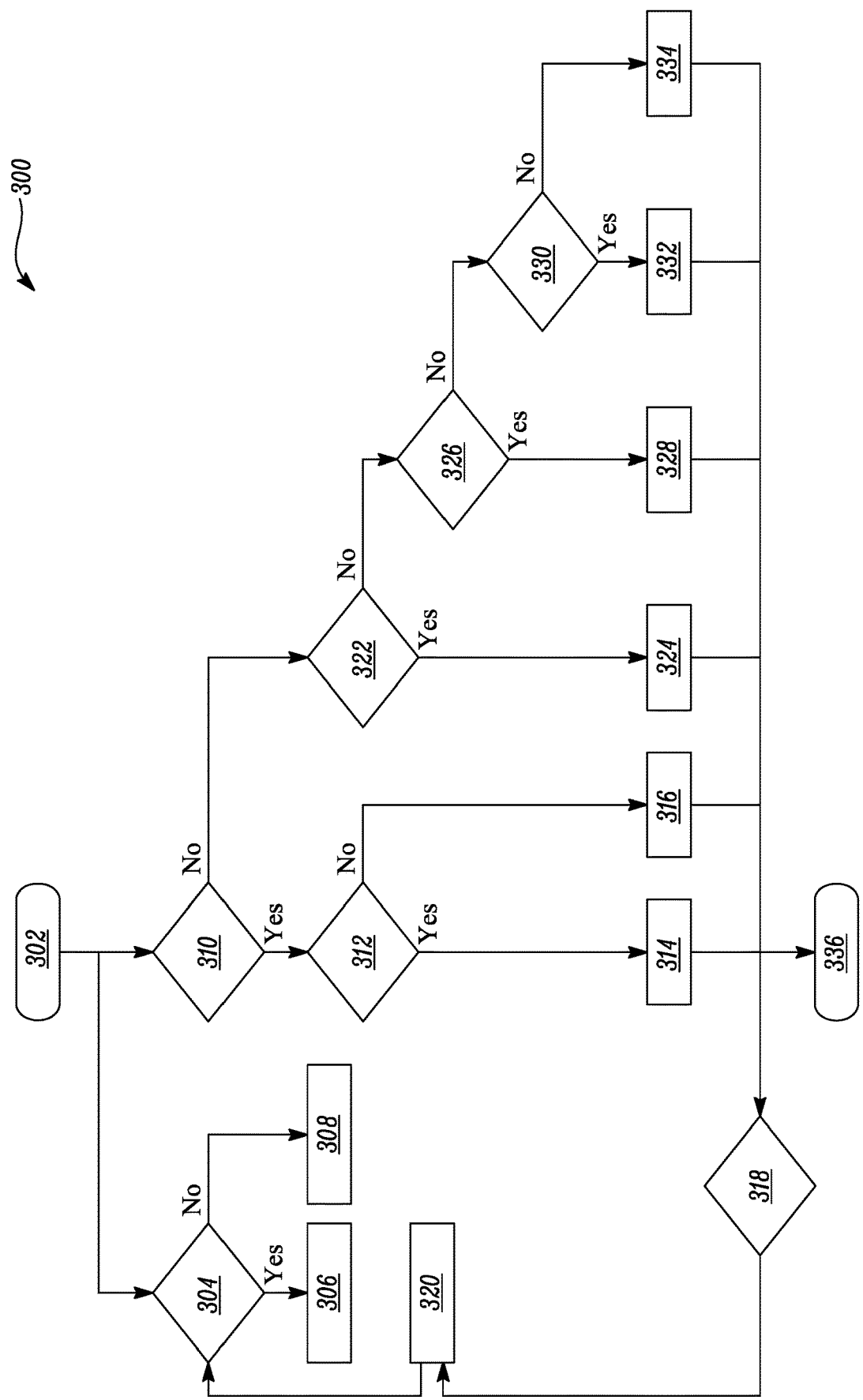
FIG. 3 is an exemplary flowchart for a process of controlling the fuel system 106 of FIG. 2, according to an example of the present disclosure.

Referring to FIG. 3, an exemplary logic flowchart of a control algorithm 300 for controlling the fuel system 106 of FIG. 1 is illustrated. With reference to FIGS. 1 to 3, the control algorithm 300 may be executed by the processors 124. The control algorithm 300 may be stored as instructions within the memories 122 of the controller 120 and may be retrieved for execution by the processors 124. At an input block 302, the control algorithm 300 starts or begins operation.

At a decision block 304, the one or more processors 124 determine if the time duration since a previous fuel switching event is greater than the fuel switchover timer threshold duration T1. If the time duration since the previous fuel switching event is greater than the fuel switchover timer threshold duration T1, the control algorithm 300 moves to a process block 306 to indicate that the fuel switchover timer threshold duration T1 has elapsed. However, at the decision block 304, the time duration since the previous fuel switching event is lesser than the fuel switchover timer threshold duration T1, the control algorithm 300 moves to a process block 308 to indicate that the fuel switchover timer threshold duration T1 has not elapsed.

At a decision block 310, the processors 124 determine if the operating speed value V1 of the prime mover 104 is lesser than the fuel type initialization speed threshold value I1 and if the fuel switchover timer threshold duration T1 has elapsed. The data for determining if the fuel switchover timer threshold duration T1 has elapsed may be retrieved from the process blocks 306 and 308. If the operating speed value V1 of the prime mover 104 is lesser than the fuel type initialization speed threshold value I1 and the fuel switchover timer threshold duration T1 has elapsed, the control algorithm 300 moves to a decision block 312.

At the decision block 312, the one or more processors 124 compare the primary pressure value P1 with each of the first upper pressure threshold value U1 and the first lower pressure threshold value L1, and the secondary pressure value P2 with each of the second upper pressure threshold value U2 and the second lower pressure threshold value L2. If the primary pressure value P1 is lesser than the first lower pressure threshold value L1, and the secondary pressure value P2 is greater than the second upper pressure threshold value U2, the control algorithm 300 moves to a process block 314. At the process block 314, the one or more processors 124 generate a control signal to supply the secondary fuel 148 to the prime mover 104, and also generate the second indication that the secondary fuel 148 is being supplied to the prime mover 104. However, at the decision block 312, if the processors 124 determine that the primary pressure value P1 is not lesser than the first lower pressure threshold value L1 or the secondary pressure value P2 is not lesser than the second lower pressure threshold value L2, the control algorithm 300 moves to a process block 316 to generate a control signal to supply the primary fuel 146 to the prime mover 104 and also generate the first indication that the primary fuel 146 is being supplied to the prime mover 104.

Control Algorithm & Timing Order. Further, from the process blocks 314, 316, the control algorithm 300 moves to a decision block 318. At the decision block 318, the processors 124 may determine if the first switch has occurred by evaluating whether the current fuel type is different from the fuel type that was being previously supplied to the prime mover 104. At the decision block 318, if the processors 124 determine that the current fuel type is different from the fuel type that was being previously supplied to the prime mover 104 or if the processors 124 determine that a particular type of fuel has been assigned to the prime mover 104, the control algorithm 300 moves to a process block 320. At the process block 320, the processors 124 perform a timer reset to indicate that a particular type of fuel has been assigned for the first time or to indicate an occurrence of a fuel switching event. The information related to the timer reset may be retrieved by the processors 124 at the decision block 304 to determine if the time duration since the previous fuel switching event or the time duration since the assignment of a particular type of fuel is greater than the fuel switchover timer threshold duration T1.

Further, at the decision block 310, if the processors 124 determine that the operating speed value V1 of the prime mover 104 is greater than the fuel type initialization speed threshold value I1 or if the fuel switchover timer threshold duration T1 has not elapsed, the control algorithm 300 moves to a decision block 322. At the decision block 322, the processors 124 determine if the absolute speed error value V2 is greater than the steady-state absolute speed error threshold value E1, or if the operating load to be applied on the prime mover 104 is greater than the rated load of the secondary fuel 148, or if the fuel switchover timer threshold duration T1 from the previous fuel switching event has not elapsed. If the absolute speed error value V2 is greater than the steady-state absolute speed error threshold value E1, or if the operating load to be applied on the prime mover 104 is greater than the rated load of the secondary fuel 148, or if the fuel switchover timer threshold duration T1 from the previous fuel switching event has not elapsed, the control algorithm 300 moves to a process block 324 at which any fuel switching between the primary and secondary fuels 146, 148 is restricted. From the process block 324, the control algorithm 300 moves to the decision block 318 to check if a fuel switch has occurred at current controller loop time and reset the timer in the same order as described in the Control Algorithm & Timing Order, above.

However, at the decision block 322, if the processors 124 determine that the absolute speed error value V2 is lesser than the steady-state absolute speed error threshold value E1, and if the operating load to be applied on the prime mover 104 is lesser than the rated load of the secondary fuel 148, and if the fuel switchover timer threshold duration T1 since the previous fuel switching event has elapsed, the control algorithm 300 moves to a decision block 326. At the decision block 326, the processors 124 determine if the primary pressure value P1 is greater than the first upper pressure threshold value U1. If the primary pressure value P1 is greater than the first upper pressure threshold value U1, the control algorithm 300 moves to a process block 328 at which the processors 124 switch to the primary fuel 146 if the prime mover 104 is being supplied with the secondary fuel 148 or continues the supply of the primary fuel 146. Further, at the process block 328, the processors 124 also generate the first indication to indicate that the primary fuel 146 is being supplied to the prime mover 104. From the process block 328, the control algorithm 300 moves to the decision block 318 to check if a fuel switch has occurred at current controller loop time and reset the timer in the same order as described in the Control Algorithm & Timing Order, above.

Further, at the decision block 326, if the processors 124 determine that the primary pressure value P1 is lesser than the first upper pressure threshold value U1, the control algorithm 300 moves to a decision block 330. At the decision block 330, the processors 124 determine if the primary pressure value P1 is lesser than the first lower pressure threshold value L1, and the secondary pressure value P2 is greater than the second upper pressure threshold value U2. If the primary pressure value P1 is lesser than the first lower pressure threshold value L1, and if the secondary pressure value P2 is greater than the second upper pressure threshold value U2, the control algorithm 300 moves to a process block 332. At the process block 332, the processors 124 perform the first switch to supply the secondary fuel 148 to the prime mover 104 instead of the primary fuel 146. Further, at the process block 332, the processors 124 also generate the second indication to indicate that the secondary fuel 148 is being supplied to the prime mover 104. From the process block 332, the control algorithm 300 moves to the decision block 318 to check if a fuel switch has occurred at current controller loop time and reset the timer in the same order as described in the Control Algorithm & Timing Order, above.

However, at the decision block 330, if the processors 124 determine that the primary pressure value P1 is greater than the first lower pressure threshold value L1, or if the secondary pressure value P2 is lesser than the second upper pressure threshold value U2, the control algorithm 300 moves to a process block 334 at which the processors 124 do not perform any fuel switch. Further, the processors 124 may continue the supply of the primary fuel 146 or the secondary fuel 148 as per previous controller loop time. From the process block 334, the control algorithm 300 moves to the decision block 318 to check if a fuel switch has occurred at current controller loop time and reset the timer in the same order as described in the Control Algorithm & Timing Order, above. Further, at an output block 336, the control algorithm 300 terminates operation.

It should be noted that the processors 124 continuously monitor various input values as described above at each controller loop time to make the required automatic switching between the primary fuel 146 and the secondary fuel 148, as and when deemed necessary.

It is to be understood that individual features shown or described for one embodiment may be combined with individual features shown or described for another embodiment. The implementation described above does not, in any way, limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The fuel system 106 of the present disclosure provides an automated means to dynamically switch between the primary fuel 146 and the secondary fuel 148 when the availability of the primary fuel 146 is impacted because of incidents, such as, pressure drops due to seismic movements, line interruptions, and the like. The fuel system 106 described herein considers the pressures of the primary fuel 146 and the secondary fuel 148 to perform the first switch or the second switch. Further, the processors 124 of the controller 120 may switch between the primary fuel 146 and the secondary fuel 148 without shutting down the prime mover 104 or impacting the performance of the system 100. Furthermore, the switching between the primary fuel 146 and the secondary fuel 148 may be performed in a time efficient manner without performing tedious manual steps, thus reducing downtime associated with the system 100. Moreover, the processors 124 may perform the fuel switch between the primary fuel 146 and the secondary fuel 148 without human intervention, thereby reducing human efforts.

The present disclosure also teaches establishment of the first upper and lower threshold values U1, L1 for the primary fuel 146. The first upper and lower threshold values U1, L1 may create hysteresis to prevent switching from or to the primary fuel 146 inadvertently, as well to prevent switching of the primary fuel assembly 108 between the on state and the off state, which may in turn allow a smoother and consistent operation of the system 100. Moreover, the present disclosure teaches establishment of the second upper and lower threshold values U2, L2 for the secondary fuel 148. The second upper and lower threshold values U2, L2 may create hysteresis to prevent switching from or to the secondary fuel 148 inadvertently, as well to prevent switching of the secondary fuel assembly 110 between the on state and the off state, which may in turn allow a smoother and consistent operation of the system 100.

Further, the primary fuel assembly 108 includes two primary valves 112, 113 and the secondary fuel assembly 110 includes two secondary valves 116, 117, which may allow a robust control of the switching between the primary and secondary fuels 146, 148. Furthermore, the fuel system 106 restricts any switching between the primary fuel 146 and the secondary fuel 148 until the elapse of the fuel switchover timer threshold duration T1, which may allow the system 100 to reach a steady and stabilized state before another fuel switch is performed. Moreover, the fuel system 106 restricts any switching between the primary fuel 146 and the secondary fuel 148 during the start-up condition or the transient condition of the prime mover 104, which may ensure stabilization of the system 100 under such operating conditions. Additionally, the fuel system 106 restricts switching from the primary fuel 146 to the secondary fuel 148 when the operating load to be applied on the prime mover 104 is greater than the rated load of the secondary fuel 148. Moreover, the fuel system 106 described herein may be used in conjunction with the vaporizer 144 that vaporizes the secondary fuel 148, for example, from liquid propane to vapor propane.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A fuel system associated with a prime mover, the fuel system comprising:
   a primary fuel assembly adapted to selectively supply a primary fuel to the prime mover;
   a secondary fuel assembly adapted to selectively supply a secondary fuel to the prime mover, wherein the primary fuel is different from the secondary fuel; and
   a controller configured to control a supply of at least one of the primary fuel and the secondary fuel to the prime mover, the controller including:
   at least one memory configured to store a fuel type initialization speed threshold value for the prime mover, a steady-state absolute speed error threshold value for the prime mover, and a fuel switchover timer threshold duration from a previous fuel switching event, wherein the at least one memory is further configured to store a first upper pressure threshold value and a first lower pressure threshold value for the primary fuel, and wherein the at least one memory is further configured to store a second upper pressure threshold value and a second lower pressure threshold value for the secondary fuel; and
   at least one processor communicably coupled with the at least one memory, wherein the at least one processor is configured to:
   determine an operating speed value of the prime mover, an operating load to be applied on the prime mover, and an absolute speed error value;
   determine if the primary fuel is being supplied to the prime mover;
   determine a primary pressure value corresponding to the primary fuel;
   determine a secondary pressure value corresponding to the secondary fuel;
   compare the primary pressure value with each of the first upper pressure threshold value and the first lower pressure threshold value, and the secondary pressure value with each of the second upper pressure threshold value and the second lower pressure threshold value;
   compare the operating speed value of the prime mover with the fuel type initialization speed threshold value for the prime mover and the absolute speed error value with the steady-state absolute speed error threshold value for the prime mover;
   compare the operating load to be applied on the prime mover with a rated load of the secondary fuel;
   determine if the fuel switchover timer threshold duration from the previous fuel switching event has elapsed; and
   perform a first switch from the primary fuel to the secondary fuel if the primary pressure value is lesser than the first lower pressure threshold value, the secondary pressure value is greater than the second upper pressure threshold value, the operating speed value of the prime mover is greater than the fuel type initialization speed threshold value for the prime mover, the absolute speed error value is lesser than the steady-state absolute speed error threshold value for the prime mover, the operating load to be applied on the prime mover is greater than the rated load of the secondary fuel, and the fuel switchover timer threshold duration from the previous fuel switching event has elapsed.

2. The fuel system of claim 1, wherein the primary fuel assembly includes at least one primary valve adapted to receive the primary fuel from a primary fuel source associated with the primary fuel assembly, wherein an opening of the at least one primary valve supplies the primary fuel to the prime mover and a closing of the at least one primary valve prevents the supply of the primary fuel to the prime mover, wherein the secondary fuel assembly includes at least one secondary valve adapted to receive the secondary fuel from a secondary fuel source associated with the secondary fuel assembly, and wherein an opening of the at least one secondary valve supplies the secondary fuel to the prime mover and a closing of the at least one secondary valve prevents the supply of the secondary fuel to the prime mover.

3. The fuel system of claim 2, wherein, to perform the first switch, the at least one processor is configured to transmit a first control signal to open the at least one secondary valve, and a second control signal to close the at least one primary valve.

4. The fuel system of claim 2, wherein the at least one processor is further configured to:
   determine if the primary pressure value is greater than the first upper pressure threshold value after the first switch from the primary fuel to the secondary fuel; and perform a second switch from the secondary fuel to the primary fuel if the primary pressure value is greater than the first upper pressure threshold value, the operating speed value of the prime mover is greater than the fuel type initialization speed threshold value for the prime mover, the absolute speed error value is lesser than the steady-state absolute speed error threshold value for the prime mover, and the fuel switchover timer threshold duration from the previous fuel switching event has elapsed, wherein, to perform the second switch, the at least one processor is configured to transmit a third control signal to open the at least one primary valve, and a fourth control signal to close the at least one secondary valve.

5. The fuel system of claim 2, wherein the primary fuel assembly includes two primary valves and the secondary fuel assembly includes two secondary valves.

6. The fuel system of claim 1, wherein the at least one processor is further configured to continue the supply of the primary fuel to the prime mover if the primary pressure value is lesser than the first lower pressure threshold value and the secondary pressure value is lesser than the second lower pressure threshold value.

7. The fuel system of claim 6, wherein the at least one processor is further configured to transmit a notification to indicate that the primary pressure value is lesser than the first lower pressure threshold value and the secondary pressure value is lesser than the second lower pressure threshold value.

8. The fuel system of claim 1, wherein the primary fuel includes natural gas and the secondary fuel includes liquid propane.

9. The fuel system of claim 1, wherein the prime mover includes an engine.

10. The fuel system of claim 1, wherein the at least one processor is further configured to generate a first indication to indicate that the primary fuel is being supplied to the prime mover, and wherein the at least one processor is further configured to generate a second indication to indicate that the secondary fuel is being supplied to the prime mover.

11. A system comprising:
a prime mover; and
a fuel system adapted to supply fuel to the prime mover, the fuel system including:
a primary fuel assembly adapted to selectively supply a primary fuel to the prime mover;
a secondary fuel assembly adapted to selectively supply a secondary fuel to the prime mover, wherein the primary fuel is different from the secondary fuel; and
a controller configured to control a supply of at least one of the primary fuel and the secondary fuel to the prime mover, the controller including:
at least one memory configured to store a fuel type initialization speed threshold value for the prime mover, a steady-state absolute speed error threshold value for the prime mover, and a fuel switchover timer threshold duration from a previous fuel switching event, wherein the at least one memory is further configured to store a first upper pressure threshold value and a first lower pressure threshold value for the primary fuel, and wherein the at least one memory is further configured to store a second upper pressure threshold value and a second lower pressure threshold value for the secondary fuel; and
at least one processor communicably coupled with the at least one memory, wherein the at least one processor is configured to:
determine an operating speed value of the prime mover, an operating load to be applied on the prime mover, and an absolute speed error value;
determine if the primary fuel is being supplied to the prime mover;
determine a primary pressure value corresponding to the primary fuel;
determine a secondary pressure value corresponding to the secondary fuel;
compare the primary pressure value with each of the first upper pressure threshold value and the first lower pressure threshold value, and the secondary pressure value with each of the second upper pressure threshold value and the second lower pressure threshold value;
compare the operating speed value of the prime mover with the fuel type initialization speed threshold value for the prime mover and the absolute speed error value with the steady-state absolute speed error threshold value for the prime mover;
compare the operating load to be applied on the prime mover with a rated load of the secondary fuel;
determine if the fuel switchover timer threshold duration from the previous fuel switching event has elapsed; and
perform a first switch from the primary fuel to the secondary fuel if the primary pressure value is lesser than the first lower pressure threshold value, the secondary pressure value is greater than the second upper pressure threshold value, the operating speed value of the prime mover is greater than the fuel type initialization speed threshold value for the prime mover, the absolute speed error value is lesser than the steady-state absolute speed error threshold value for the prime mover, the operating load to be applied on the prime mover is greater than the rated load of the secondary fuel, and the fuel switchover timer threshold duration from the previous fuel switching event has elapsed.

12. The system of claim 11, wherein the primary fuel assembly includes at least one primary valve adapted to receive the primary fuel from a primary fuel source associated with the primary fuel assembly, wherein an opening of the at least one primary valve supplies the primary fuel to the prime mover and a closing of the at least one primary valve prevents the supply of the primary fuel to the prime mover, wherein the secondary fuel assembly includes at least one secondary valve adapted to receive the secondary fuel from a secondary fuel source associated with the secondary fuel assembly, and wherein an opening of the at least one secondary valve supplies the secondary fuel to the prime mover and a closing of the at least one secondary valve prevents the supply of the secondary fuel to the prime mover.

13. The system of claim 12, wherein, to perform the first switch, the at least one processor is configured to transmit a first control signal to open the at least one secondary valve, and a second control signal to close the at least one primary valve.

14. The system of claim 12, wherein the at least one processor is further configured to:

determine if the primary pressure value is greater than the first upper pressure threshold value after the first switch from the primary fuel to the secondary fuel; and perform a second switch from the secondary fuel to the primary fuel if the primary pressure value is greater than the first upper pressure threshold value, the operating speed value of the prime mover is greater than the fuel type initialization speed threshold value for the prime mover, the absolute speed error value is lesser than the steady-state absolute speed error threshold value for the prime mover, and the fuel switchover timer threshold duration from the previous fuel switching event has elapsed, wherein, to perform the second switch, the at least one processor is configured to transmit a third control signal to open the at least one primary valve, and a fourth control signal to close the at least one secondary valve.

15. The system of claim 12, wherein the primary fuel assembly includes two primary valves and the secondary fuel assembly includes two secondary valves.

16. The system of claim 11, wherein the at least one processor is further configured to continue the supply of the primary fuel to the prime mover if the primary pressure value is lesser than the first lower pressure threshold value and the secondary pressure value is lesser than the second lower pressure threshold value.

17. The system of claim 16, wherein the at least one processor is further configured to transmit a notification to indicate that the primary pressure value is lesser than the first lower pressure threshold value and the secondary pressure value is lesser than the second lower pressure threshold value.

18. The system of claim 11, wherein the primary fuel includes natural gas and the secondary fuel includes liquid propane.

19. The system of claim 11, wherein the prime mover includes an engine.

20. The system of claim 11, wherein the at least one processor is further configured to generate a first indication to indicate that the primary fuel is being supplied to the prime mover, and wherein the at least one processor is further configured to generate a second indication to indicate that the secondary fuel is being supplied to the prime mover.

* * * * *